J. B. DE BORD.
LAMP BRACKET.
APPLICATION FILED APR. 8, 1909.

931,848.

Patented Aug. 24, 1909.

WITNESSES
Mary Sholderer
W. R. Sampson

James B. DeBord INVENTOR

BY
L. L. Westfall ATTORNEY

UNITED STATES PATENT OFFICE.

JAMES B. DE BORD, OF SPOKANE, WASHINGTON, ASSIGNOR OF ONE-THIRD TO ERNEST BRIMNER, OF MONROE, OREGON.

LAMP-BRACKET.

931,848.      Specification of Letters Patent.      Patented Aug. 24, 1909.

Application filed April 8, 1909. Serial No. 488,601.

*To all whom it may concern:*

Be it known that I, JAMES B. DE BORD, a citizen of the United States, residing at Spokane, in the county of Spokane and State of Washington, have invented certain new and useful Improvements in Lamp-Brackets, of which the following is a specification.

This invention pertains to lamp brackets, and has for its object to provide a holder for a lamp or lantern by means of which the same may be secured to the pole, shafts, dash-board or other part of a vehicle whereby the rays of light from a lamp or lantern may be thrown to illuminate the space and the roadway about the same.

A particular object is to provide a bracket for the holding of a lamp or lantern to a vehicle as aforesaid and secure the same in such a manner that the same will be secure against sudden jolts and movements of the vehicle and will be safely guarded against breakage and against falling from its position in the bracket.

In the accompanying drawings, I have applied the principles involved in my invention to the securing of an ordinary hand lantern into one of the brackets of the character contemplated.

Figure 4:
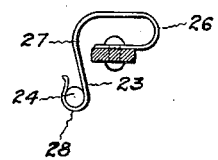
Figure 1:
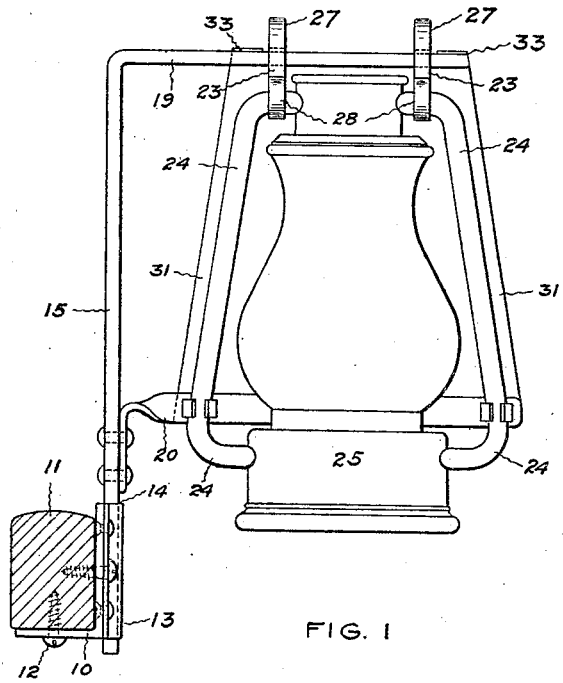
Figure 5:
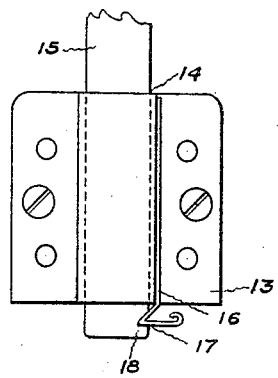
Figure 2:
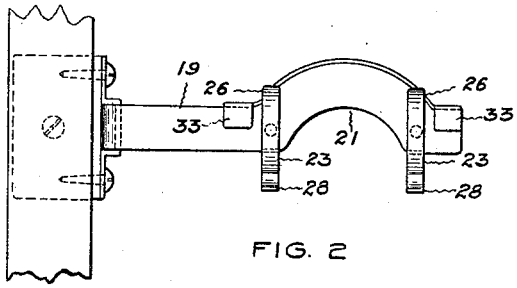
Figure 6:
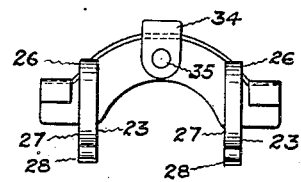
Figure 3:
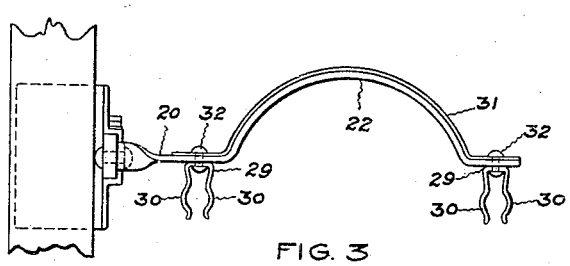

Figure 1, is a front elevation of the bracket with the lantern attached and showing a transverse section of one of the shafts of a vehicle, Fig. 2, is a plan view of the upper arm of the bracket, Fig. 3, is a plan view of the lower arm of the bracket, Fig. 4, is a side view of one of the springs attached to the upper arm of the bracket together with a transverse sectional view of the upper arm of the bracket and of the frame of a lantern, Fig. 5, is a view of the socket to be attached to the shaft or other portion of the vehicle together with the lower end of the perpendicular standard of the bracket and a tension spring used for retaining the standard in its position in the socket, and Fig. 6, is a plan view of the upper arm of the bracket together with means of securing the same to the standard of the bracket where it is desired to face the lantern at right angles with the position on the shaft or pole of the vehicle as shown in Fig. 1.

For the purpose of providing a pocket to retain the bracket, I have provided a plate 10, extending in a perpendicular position along the outer side of the shaft 11, and in a horizontal position along the under side thereof and secured thereto by screws 12. Secured in a perpendicular position to the outside of the plate 10, is the curved plate 13 forming a socket or pocket 14, into which the standard 15 is placed when it is desired to attach a light to the vehicle.

In order to make the standard secure in the pocket 14, I have attached to the outer surface of the plate 13, a tension spring 16 bent to a point as at 17 to engage a notch 18 into and near the bottom of the standard 15 and which may be released with the hand when it is desired to remove the standard 15. The tension spring 16 should be of sufficient strength to retain the standard 15 after it has entered the notch 18 to prevent the standard 15 from entering the pocket or socket 14 more than a predetermined amount, however, the lower arm 20 may be secured to the standard 15 in such a manner as to provide a shoulder to bear against the top of the socket or pocket 14, thereby preventing the standard 15 from dropping farther into the socket 14 than desired.

Extending in a horizontal position from the standard 15 is an upper arm 19 and a lower arm 20, the outer portions of which as at 21 and 22 are curved to fit the form of an ordinary hand lantern. Secured to the upper arm 19 at each side of the curve 21, are supports 23, adapted to engage the upper portions of the frame 24 of the lantern 25. These supports 23 are constructed of resilient metal, are riveted to the arm 19 at one end, extend thence rearward and then upward on a curve as at 26, thence forward, thence downward on a curve as at 27, terminating in a loop as at 28. Secured to the lower arm 20 at each side of the curve 22 are clamps 29, adapted to receive and retain the lower ends of the frame 24 of the lantern 25. These clamps 29 are made of resilient metal and consist practically of a bifurcated piece of metal riveted to the arm 20 and are curved intermediately as at 30 outwardly to properly engage and hold fast the circular frame 24 of the lantern. Secured also to the arms 19 and 20 and formed to fit the curves 21 and 22 to the rear of the lantern 25 is a reflector 31, the same is held in place by the rivets 32 passing through the same, through the arm 21 and through the clamps 29 and is secured to the upper arm 19 by being bent over the same as at 33.

If it is desired to face the lantern at right angles with the position shown in Fig. 1, as would be the case if the lantern was secured to the dash-board of a vehicle, modified forms of the arms 19 and 20 may be secured to the standard 15 for instance as shown by Fig. 6, the same to be used in lieu of the upper arm 19 shown in Fig. 1, the short arm 34 to be attached to the standard 15 and the modified arm secured to the same by means of a pin passing through the opening 35 reaching through the modified arm. A similar modification of the lower arm 20 would be used in lieu of the arm shown in Fig. 3.

The lamp or lantern practically rides upon the resilient supports 23 thereby enabling it to adjust itself to the movements of the vehicle while the lower portion of the frame 24 will glide upward and downward in the clamps 29 to permit of the free action of the resilient supports 23.

Having thus described my invention, what I claim as new and useful and desire to secure by Letters Patent, is:

In a lamp bracket of the character described a plate to be secured to a vehicle, a socket plate attached thereto, an upright standard extending into the socket plate and provided with a notch near its lower end, a spring attached to the socket plate and extending into said notch, upper and lower cross-arms secured to the upright standard, supports connected to the upper cross-arm, said supports being curved and formed into loops at their lower ends for securing a lantern, clamps connected to the lower cross-arm, each clamp consisting of metal bent to a U-shape with arms curved outwardly to receive and hold the frame of a lantern, substantially as described.

In testimony whereof I affix my signature, in presence of two witnesses.

JAMES B. DE BORD.

Witnesses:
W. R. SAMPSON,
MARY SHOLDERER.